(12) United States Patent
Collins et al.

(10) Patent No.: US 7,483,344 B2
(45) Date of Patent: Jan. 27, 2009

(54) COMPACT PICKER SYSTEMS AND METHODS FOR AUTOMATED STORAGE LIBRARIES

(75) Inventors: Paddy E. Collins, Colorado Springs, CO (US); Ryan S. Porter, Monument, CO (US)

(73) Assignee: Quantum Corporation, San Jose, CA (US)

( * ) Notice: Subject to any disclaimer, the term of this patent is extended or adjusted under 35 U.S.C. 154(b) by 514 days.

(21) Appl. No.: 11/058,386

(22) Filed: Feb. 14, 2005

(65) Prior Publication Data

US 2006/0181805 A1     Aug. 17, 2006

(51) Int. Cl.
G11B 17/22 (2006.01)
G11B 21/08 (2006.01)

(52) U.S. Cl. .............. 369/30.43; 369/30.45; 360/92.1

(58) Field of Classification Search .......... 360/92, 360/96.5; 720/607, 613, 633, 641; 369/30.38–30.63
See application file for complete search history.

(56) References Cited

U.S. PATENT DOCUMENTS

| | | | |
|---|---|---|---|
| 4,286,380 A | 9/1981 | Blount | |
| 5,237,467 A | 8/1993 | Marlowe | |
| 5,253,911 A | 10/1993 | Egan et al. | |
| 5,421,697 A * | 6/1995 | Ostwald | 414/753.1 |
| 5,429,470 A | 7/1995 | Nicol et al. | |
| 5,487,579 A | 1/1996 | Woodruff | |
| 5,691,659 A | 11/1997 | Ulrich et al. | |
| 5,805,561 A * | 9/1998 | Pollard | 369/30.43 |
| 5,820,055 A | 10/1998 | Leger et al. | |
| 5,848,872 A | 12/1998 | Manes et al. | |
| 5,862,116 A * | 1/1999 | Watanabe et al. | 720/673 |
| 6,229,666 B1 * | 5/2001 | Schneider et al. | 360/92 |
| 6,236,530 B1 | 5/2001 | Schneider et al. | |
| 6,266,316 B1 | 7/2001 | Luffel et al. | |
| 6,271,982 B1 * | 8/2001 | Helmick | 360/92 |

(Continued)

FOREIGN PATENT DOCUMENTS

DE     197 09 585 A1     9/1998

(Continued)

OTHER PUBLICATIONS

European Search Report mailed on Oct. 9, 2008, for EP Patent Application No. 06250776.9 filed on Feb. 14, 2006, four pages.

Primary Examiner—Brian E Miller
Assistant Examiner—Adam B Dravininkas
(74) Attorney, Agent, or Firm—Morrison & Foerster LLP

(57) ABSTRACT

In one aspect of the invention, an apparatus for handling storage cartridges within an automated storage library is provided. In one example, the apparatus includes a frame, a translating member, e.g., a leadnut/leadscrew, and a finger mechanism slidably mounted to the frame. The translating member is operable to translate along the frame. The finger mechanism includes a finger member for engaging a storage device, and the finger mechanism is mechanically associated with the translating member such that translation of the translation member relative to the picker frame results in a translation of the finger mechanism relative to the translation member such that the finger mechanism moves a greater distance than the translation member. A gear assembly, mounted to the translation member, may rotate during translation to cause relative movement of the translation member and finger mechanism.

15 Claims, 7 Drawing Sheets

U.S. PATENT DOCUMENTS

| | | |
|---|---|---|
| 6,473,261 B1 | 10/2002 | Miller et al. |
| 6,707,636 B2 | 3/2004 | Coffin et al. |
| 2004/0066119 A1* | 4/2004 | Chaloner et al. ........... 312/9.43 |
| 2005/0038231 A1 | 2/2005 | Dickey et al. |

FOREIGN PATENT DOCUMENTS

| | | |
|---|---|---|
| EP | 1 024 487 B1 | 8/2000 |
| JP | 2000-185806 A | 7/2000 |
| SU | 910 498 | 3/1982 |

* cited by examiner

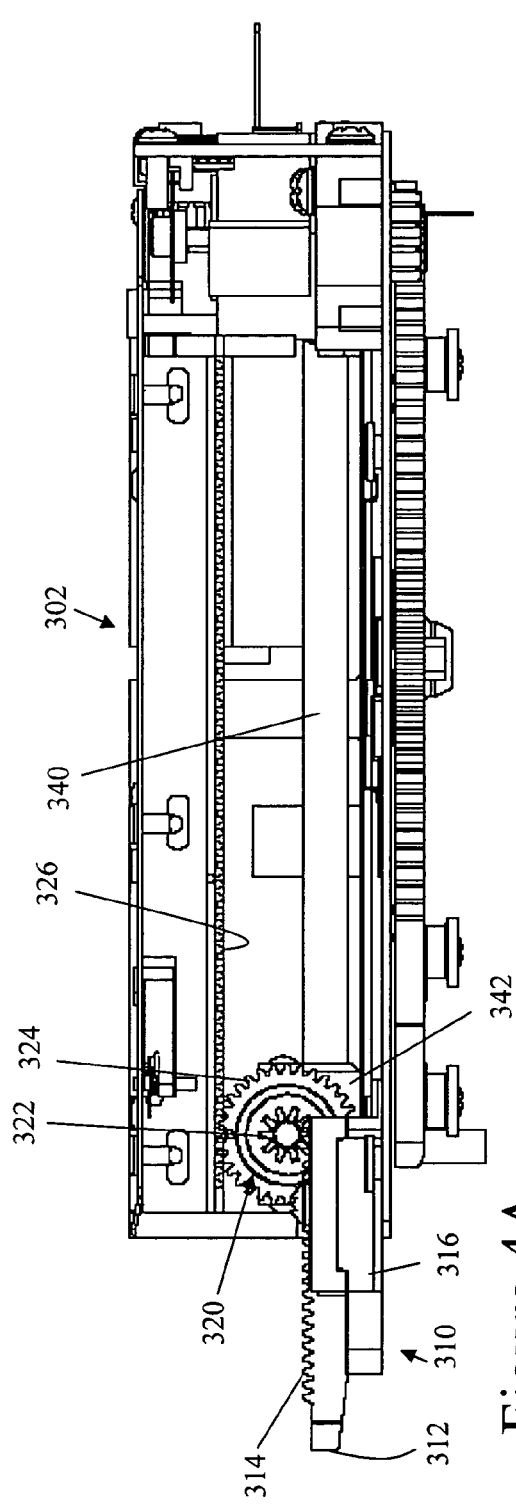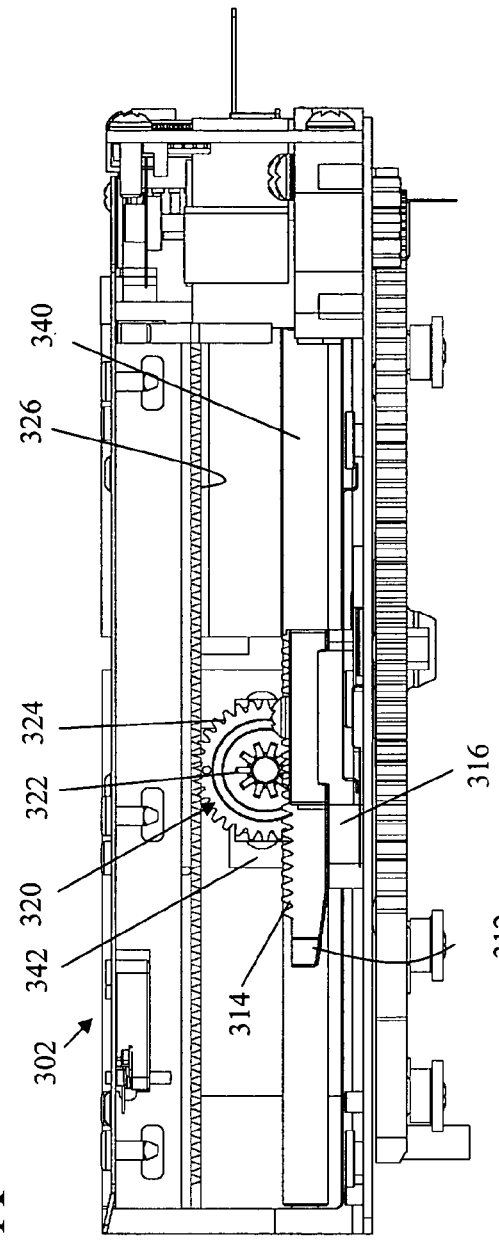
Figure 4A
Figure 4B

COMPACT PICKER SYSTEMS AND METHODS FOR AUTOMATED STORAGE LIBRARIES

BACKGROUND OF THE INVENTION

1. Field

The present invention relates generally to systems and methods associated with handling storage devices, and more particularly to systems and methods for picker mechanisms for use within automated storage libraries.

2. Description of Related Art

Magnetic tape cartridges have proven to be an efficient and effective medium for data storage in computer systems. Large computer systems may utilize numerous cartridges for data storage purposes as well as a plurality of tape drives for inputting and outputting data to and from storage cartridges in a timely manner. Typically, as the number of storage cartridges grows they are organized in automated storage libraries. Automated storage libraries including, e.g., magnetic tape cartridges, may improve access speed and reliability of data storage systems having large numbers of magnetic tape cartridges.

Automated storage libraries generally include a plurality of storage bins or slots for storing storage devices (e.g., magnetic, optical, etc.), a robotic cartridge picker mechanism (often referred to as a "gripper" or "hand"), and one or more media drives. The robotic picker may be controlled to select a specific storage device from the library and transfer the storage device between a storage slot and a media drive within seconds. The robotic picker typically includes a gripper or hand mechanism for handling the storage devices. For example, the robotic picker may position the gripper near a desired storage device and activate the gripper to engage or grip the storage device to remove the storage device from the storage bin. In other examples, a finger or hook may be used to engage and drag the storage device into or onto the transfer mechanism. The robotic arm may move the gripper and storage device to a location to load the storage device into a storage drive, load port (for adding or removing storage devices from the library), and the like.

Generally, storage device slots, media drives, access doors, and the like are arranged within a library housing to maximize the storage capacity for a given housing size. As a result, the picker mechanism generally moves in three dimensions when transferring storage devices between storage slots, media drives, and access doors. For example, the picker mechanism may move along one or more tracks in the x and y dimensions (on a plane parallel to the base). The track may further rise in the vertical direction, the z-dimension, thereby allowing the picker mechanism three degrees of movement.

The density at which storage device slots, media drives, and the like may be disposed within the library housing relies, at least in part, on the ability of the picker mechanism of the storage library to maneuver and access the storage cartridge slots, media drives, and the like. For example, an increase in the storage density of the storage library may be achieved by decreasing the room needed for a picker mechanism to move and engage storage devices within the storage library. Thus, a compact picker mechanism is generally desired to increase the storage capacity of an automated storage library.

BRIEF SUMMARY

In one aspect of the present inventions, an apparatus for transferring storage devices within an automated storage library is provided. In one example, the apparatus includes a frame, a translation member, e.g., a leadnut operable with a leadscrew, and a finger mechanism slidably mounted to the frame. The translation member is operable to translate along the frame. The finger mechanism includes a finger member for engaging a storage device, and the finger mechanism is mechanically associated with the translation member such that translation of the translation member relative to the frame results in a translation of the finger mechanism relative to the translation member. In one example, translation of the translation member a given distance results in translation of the finger mechanism a distance different (e.g., greater or less) than the distance of the translation member.

The apparatus may further include a gear assembly rotatably mounted to the translation member, wherein a first portion of the gear engages a portion of the housing, e.g.; a rack of castellations or teeth, and a second portion of the gear engages a portion of the finger mechanism, e.g., a rack of castellations or teeth, such that translation of the translation member results in rotation of the gear assembly and relative movement of the translation member and the finger mechanism. The gear assembly may include two co-axially attached gears corresponding to the first portion and the second portion, wherein the two co-axially attached gears vary in at least one characteristic, e.g., diameter or teeth.

According to another aspect, an automated storage library system is provided. In one example, the automated storage library system includes a telescoping finger mechanism associated with a picker. The picker may include a translation member and a finger mechanism for engaging a storage device of the library, wherein translation of the translation member relative to the picker results in a translation of the finger mechanism relative to the translation member. In one example, translation of the translation member a given distance results in translation of the finger mechanism a distance different (e.g., greater or less) than the distance of the translation member. The finger mechanism may thereby move a distance greater than the depth of the picker to extend and engage a storage device.

According to another aspect, a method for engaging storage devices within an automated storage library system is provided. In one example, the method includes moving a translation member along a picker frame, the translation member associated with a finger mechanism for engaging a storage device. A gear may be disposed between the finger mechanism and the translation member such that as the translation member is translated the finger mechanism moves relative to the translation member. The finger mechanism may thereby travel a distance greater than the translation member and extend from the picker to engage a storage device.

The present invention and its various embodiments are better understood upon consideration of the detailed description below in conjunction with the accompanying drawings and claims.

BRIEF DESCRIPTION OF THE DRAWINGS

FIGS. 4A and 4B illustrate a side view of the exemplary telescoping finger mechanism in a fully extended and partially retracted position.

DETAILED DESCRIPTION OF THE INVENTION

Figure 1:
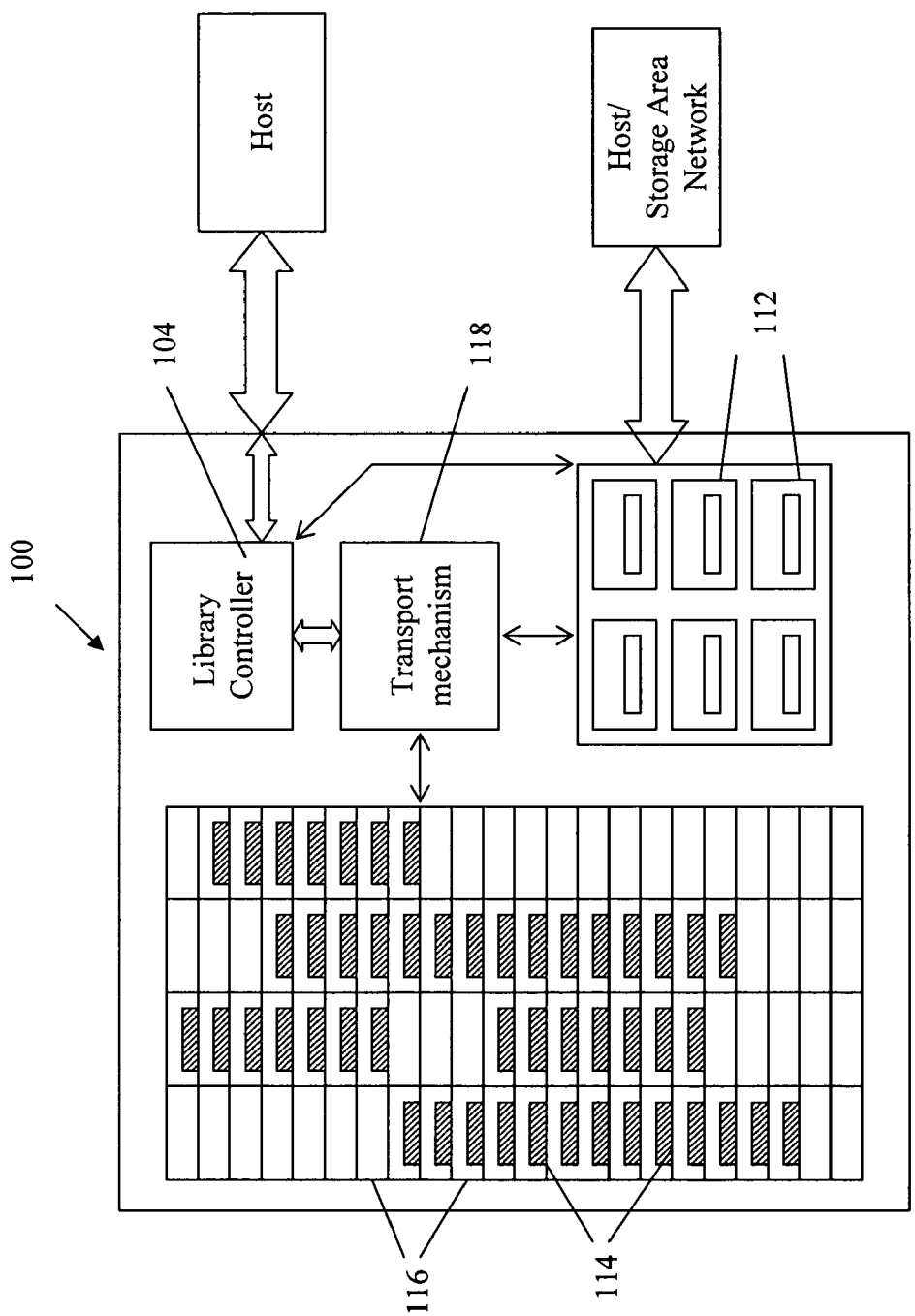
FIG. 1 illustrates a schematic view of an exemplary automated storage library system.

Exemplary systems and methods described herein relate generally to storage device manipulation systems, e.g., a picker mechanism, which may be used in an automated storage library to transfer storage devices to various storage device interfaces such as media drives (for reading/writing data), magazines (for portable device storage), fixed slots (for non-portable device storage), and a transport station (for transporting a storage device to another library device such as an elevator or the like). The following description is presented to enable a person of ordinary skill in the art to make and use various aspects of the invention. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described and shown, but is to be accorded the scope consistent with the appended claims.

According to one aspect described herein, systems and methods for maneuvering a finger mechanism included with a picker mechanism are provided. In one example, a translation member (e.g., a leadnut) is used to move a finger mechanism (e.g., having a hook or member to engage a storage device), whereby movement of the finger mechanism is greater than movement of the translation member (e.g., movement of the translation member is amplified to the finger mechanism). In particular, the translation member cooperates with the finger mechanism such that as the translation member is translated relative to the picker mechanism, the finger mechanism moves relative to the translation member in a telescoping fashion. A gear assembly may be positioned between the translation member and the finger mechanism such that as the translation member is translated by the leadscrew the gear assembly rotates and causes relative movement between the finger mechanism and the translation member, thereby moving the finger mechanism a greater distance than the translation member.

In one example, the gear assembly may include a large and small diameter gear portion rotatably mounted to a leadnut, where the large diameter portion engages a portion of the picker housing or frame or other stationary portion of the picker and the small diameter portion engages a portion of the finger mechanism. The housing may include a rack, e.g., a row of castellations or teeth, that engage the larger diameter portion of the gear causing rotation as the leadnut and gear are translated. The finger mechanism may further include a rack that engages the smaller diameter portion of the gear. Thus, as the leadnut is advanced the gear rotates resulting in the finger mechanism translating a distance greater than the leadnut.

Various examples described herein allow for a telescoping, compact picker mechanism wherein translation of the finger mechanism is greater than the leadnut. Generally, the extension distance of a leadscrew/leadnut system for extending a finger block on a picker mechanism is restricted, at least in part, by the depth of the picker mechanism and the allowed space within a storage library. Exemplary systems may allow a picker to translate a finger mechanism distances greater than the depth of the picker and leadnut/leadscrew system to engage storage devices. Such systems may reduce the space required for a picker and finger mechanism to engage storage devices leading to greater storage density within a storage library.

The examples described herein are generally described as a magnetic tape library including multiple magnetic tape cartridges. It should be understood, however, that the various examples are contemplated with use for other types of storage devices, storage media drives, and storage libraries. For example, a storage library may include various optical storage devices alone or in combination with various magnetic storage devices and the like.

FIG. 1 is a schematic illustration of an exemplary automated storage library system 100 for the storage and retrieval of a plurality of storage cartridges 114 stored therein. Library system 100 includes one or more media drives 112, a plurality of storage devices or cartridges 114 stored in bins or storage slots 116, and a transport mechanism 118 that may be equipped with a finger block mechanism as described below. The transport mechanism 118 includes an exemplary picker mechanism (not shown) for transporting a selected cartridge 114, for example, between a drive 112 and a storage slot 1116. Storage library system further includes a library controller 104 that communicates with a host processor or computer network to control the actions of transport mechanism 118 and drives 112 to retrieve and/or store data.

Library controller 104 may include a single general purpose computer, microprocessor, microcontroller, and the like. Alternatively, a separate cartridge loader controller and a library system controller may be included. A general library controller 104, tape cartridge loader controller, or library controller may include any programmable general purpose computer or processor and preferably will have a suitably programmed microprocessor or microcontroller. The input-output connections between the library controller and various other components of the library system 100 may include well-known industry standard cabling and communication protocols. For example, Ethernet, Inter-Integrated Circuit bus (I2C), Small Computer System Interface (SCSI), ultra-wide SCSI, fast SCSI, fibre channel, and the like.

Library controller 104 operates to coordinate movements and actions of media drives 112, robotic transport mechanism 118, and the like. The controller 104 may include a suitable processor as described above and is typically interconnected with a host processor, which sends access commands to controller 104. In this example, information recorded to or read from one or more of the cartridges 114 is transmitted between one of the drives 112 to the host or a storage area network through a second data path connection, e.g., a fibre channel bridge or the like.

Media drives 112 may include, for example, magnetic tape drives and/or optical disk drives, and cartridges 114 may include, for example, magnetic and/or optical storage devices. An exemplary drive includes the SDLT™ 320 magnetic tape drive, and an exemplary storage cartridge includes the Super DLTape™ Type I storage cartridge both sold by Quantum Corporation. It should be understood, however, that other storage devices and media drives may be used.

Automated storage library system 100 may further include various other features such as load ports for manually adding and removing cartridges to and from the library, various access doors, control panels, power supplies, and the like as are known in the art. For clarity, however, such additional features have been omitted from the description.

Figure 2:
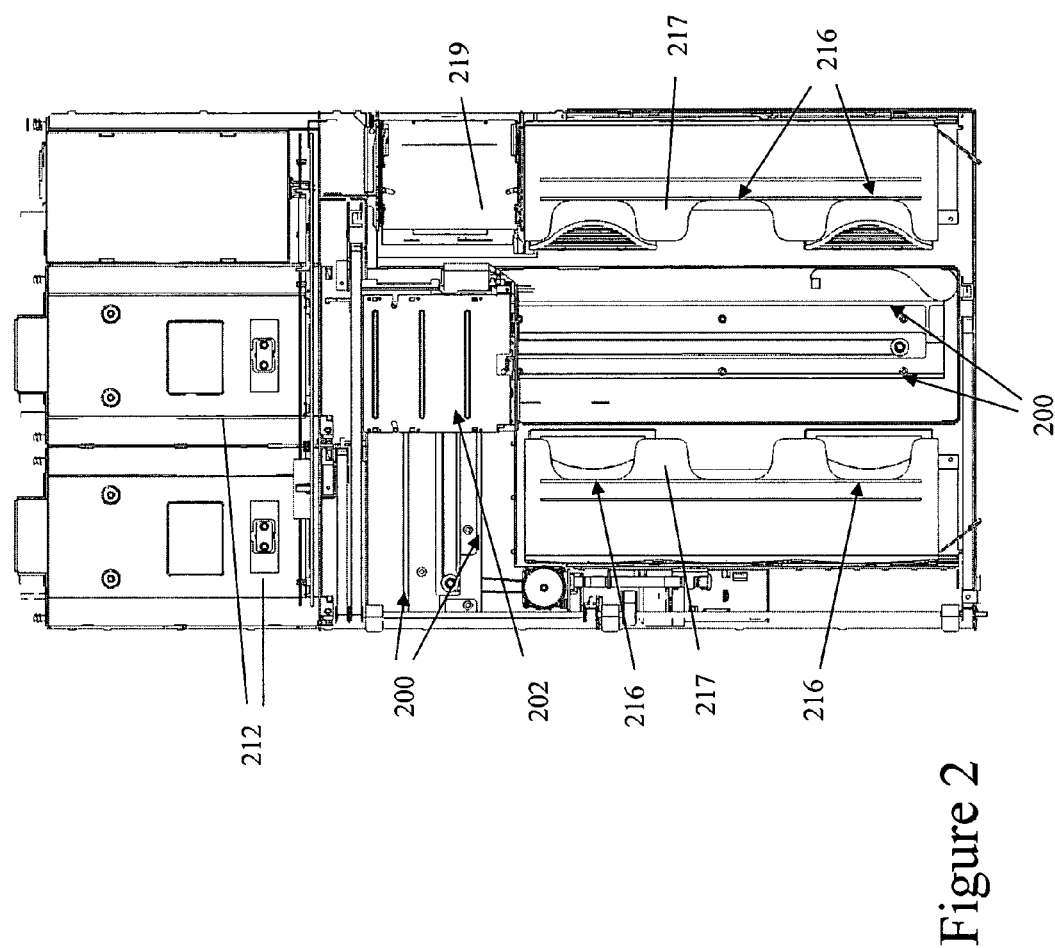
FIG. 2 illustrates a top view of an exemplary automated storage library system and transport mechanism.
Figure 3A:
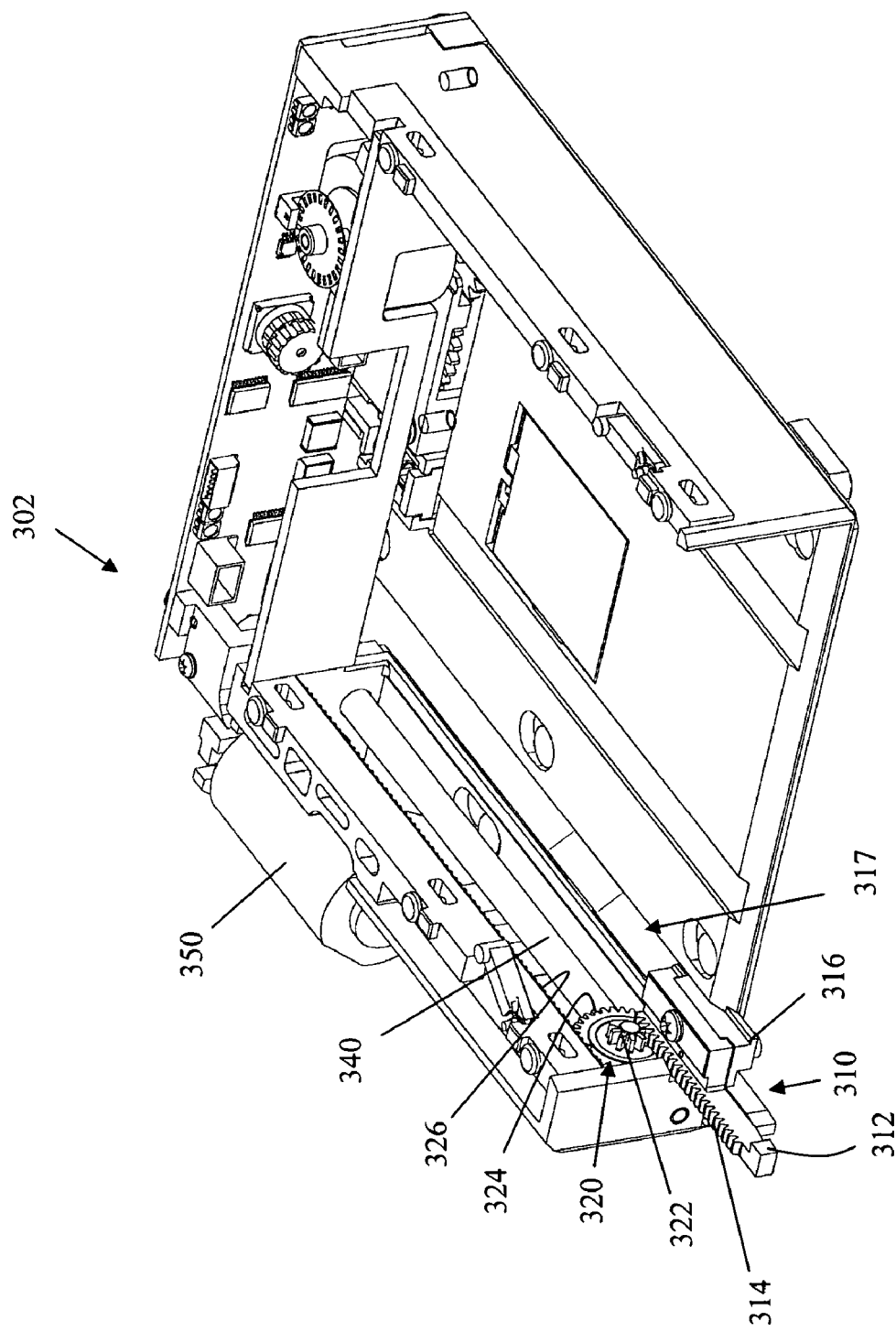
FIGS. 3A-3C illustrate a perspective view of an exemplary telescoping finger mechanism in a fully extended, partially retracted, and fully retracted position.
Figure 3B:
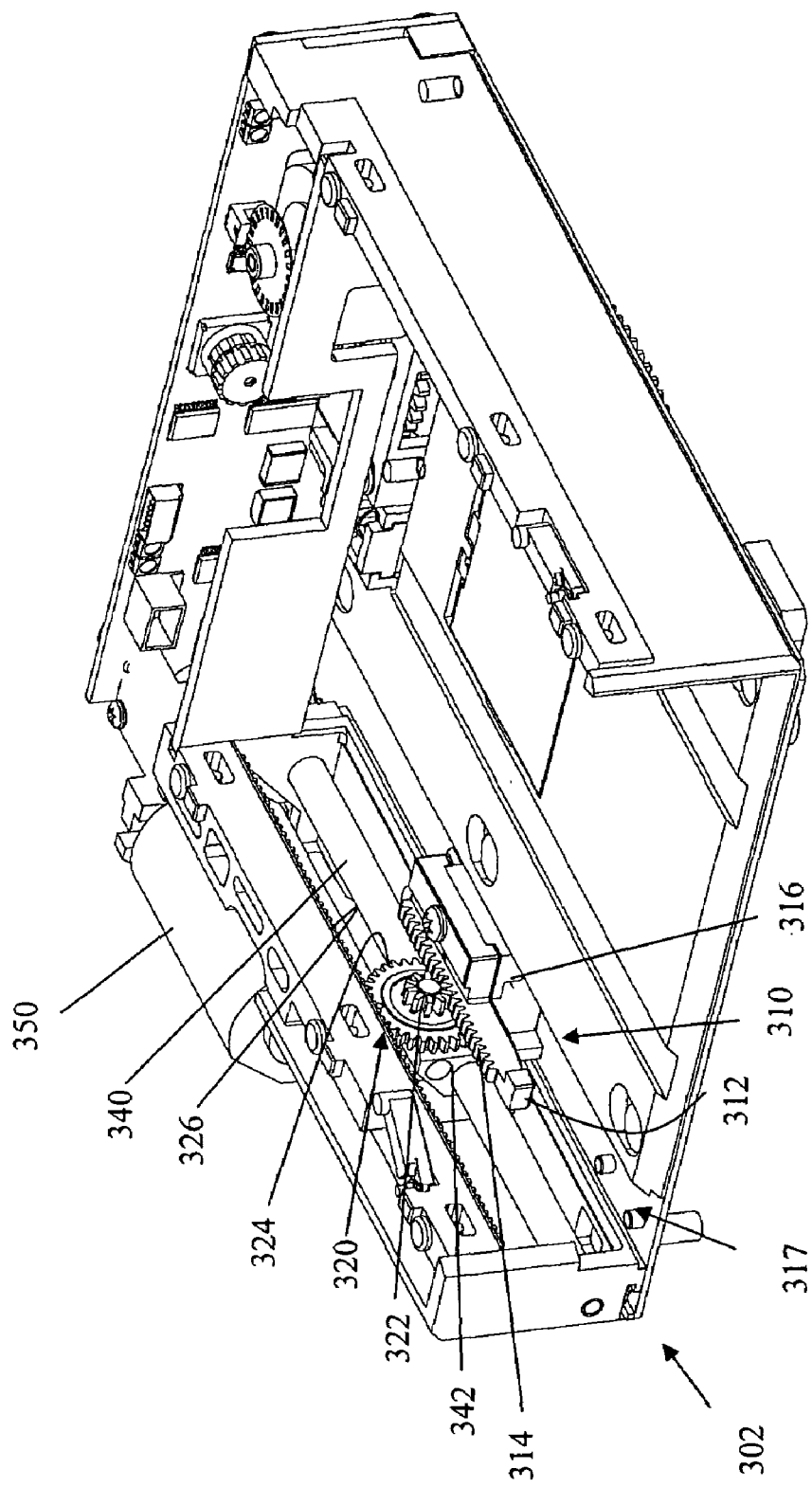
Figure 3C:
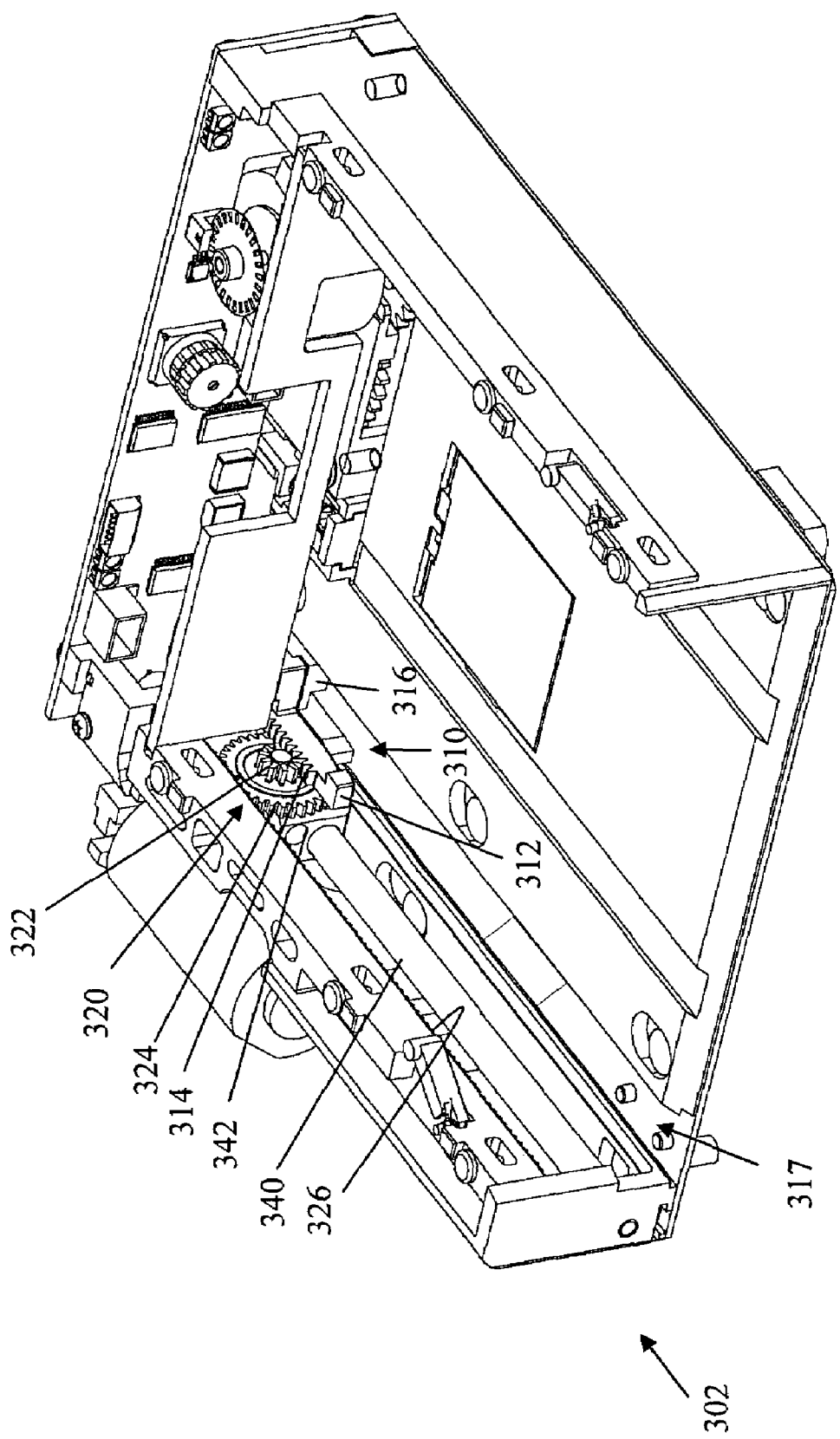

FIGS. 2, 3A-C, and 4A-B illustrate an exemplary picker mechanism for use within an automated storage library according to one example and are advantageously referenced in combination. In particular, FIG. 2 illustrates a top view of an automated storage library including an exemplary picker mechanism, FIGS. 3A-3C illustrate perspective views of an exemplary finger mechanism in an extended, partially retracted, and fully retracted position, and FIGS. 4A-4B illustrate side views of the exemplary finger mechanism in an extended and partially retracted position.

With reference to FIG. 2, a top view of an exemplary transport system within an automated storage library housing is shown. Various devices are serviced by picker 202, sometimes referred to as a "hand" or "gripper." For example, the storage library includes storage bins 216, media drives 212, and pass-through 219, which may be serviced by picker 202 along track 200. Storage bins 216 are arranged in magazines 217 facing an interior of the library housing. A track 200 for picker 202 runs between and adjacent to storage bins 216 to transfer picker 202 to an appropriate position to retrieve or place a storage cartridge from or with storage bin 216. Picker 202 is shown in a position that would service the rightmost media drive 212 or pass through 219. Picker 202 also has a rotational degree of freedom, controlled by a motor, which allows picker 202 to rotate relative to the sled and track 200, e.g., rotating 180 degrees or more, to access various positions along track 200.

Track 200 and picker 202 run between cartridge magazines 217. Generally, it is desirable to position cartridge magazines 217 as densely as possible while still allowing picker 202 to move therebetween and access storage cartridges with storage bins 216. Generally, the finger mechanism is desired to move a distance greater than the depth of a storage cartridge and picker 202 to engage and pull a storage cartridge completely onto picker 202. A telescoping finger mechanism allows for the finger mechanism to translate a distance greater than the depth of picker 202. Accordingly, exemplary picker 202, having a telescoping finger mechanism, may move between cartridge magazines 217 to engage and transport storage cartridges that are more densely positioned than typical with a conventional picker and finger mechanism.

FIGS. 3A and 4A illustrate a picker assembly having an exemplary telescoping finger mechanism 310 in an extended position, e.g., to engage a storage device. The exemplary system generally includes a translation member, in this example, leadnut 342 (not shown in FIG. 3A), leadscrew 340, gear 320, and finger mechanism 310 including a hook or engaging member 312, rack 314, and finger block 316. In operation, leadscrew 340 drives leadnut 342 along leadscrew 340 when activated by motor 350. Leadnut 342 is mechanically coupled to finger block 310 which translates parallel to leadscrew 340 along track 317 disposed with frame 302. Finger block 316 remains within track 317 during movement of finger mechanism 312.

It is noted that the translation member is illustrated as leadnut 342 operable with leadscrew 340 in this example for illustrative purposes only. In other examples, leadnut 342 and leadscrew 340 may be replaced with other suitable translation members and systems such as moving a member along a belt, a linear rack and pinion system, a voice coil, or the like. Accordingly, those of ordinary skill in the art will recognize that other translations systems are possible and contemplated. Additionally, leadscrew 340 may be activated by motor 350 through a gear train (not shown) or other suitable mechanism(s).

Gear 320 (including small gear 322 and large gear 324) is rotatably mounted to leadnut 342 and engages rack 326 of frame 302 and rack 314 of finger mechanism 310. In particular, a first portion or large diameter gear 324 engages rack 326 and rotates as leadnut 342 moves along leadscrew 340. A second portion or small diameter gear 322 engages rack 314 of finger mechanism 310. Rotation of small gear 322 and large gear 324 causes relative movement of finger mechanism 310 with leadnut 342. For example, as leadnut 342 is translated along leadscrew 340, large gear 324 engages rack 326 and rotates both large gear 324 and small gear 322 as small gear 322 engages rack 314, thereby causing relative movement between leadnut 342 and finger block 310.

In one example, large gear 324 of gear 320 engages a portion of picker 302, in this example, teeth or castellations of rack 326 disposed above gear 320. The engagement with castellations 326 results in rotation of gear 320. Gear 320, and in particular, the small diameter gear 322, engage the castellations of rack 314 along finger mechanism 310. Accordingly, gear 320 rotates as leadnut 342 translates, but otherwise remains stationary with respect to leadnut 342. As gear 320 rotates and translates with leadnut 342, finger mechanism 310 translates in relation to leadnut 342. In other examples, large gear 324 and/or small gear 322 may include friction rollers or the like (see, e.g., FIG. 5).

In this example, gear 320 is rotatably mounted to leadnut 342, and the large gear 324 and small gear 322 are coaxially and statically coupled. If leadnut 342 were statically attached to finger mechanism 310 (e.g., without gear 320 or other suitable device), finger mechanism 310 would move the same distance as leadnut 342. Leadnut 342 would therefore have to translate a distance equal to the desired translation distance of finger mechanism 310. As shown in the present example, however, the addition of gear 320 and racks 326 and 314 cause rotation of gear 320 and relative movement between leadnut 342 and finger mechanism 310 during translation of leadnut 342. The relative movement between leadnut 342 and finger mechanism 310 allows finger mechanism 310 to translate a distance greater than leadnut 342.

With reference to FIGS. 3B and 4B, finger mechanism 310 moves relative to leadnut 342 and gear 320 as leadnut 342 is retracted toward the back of picker frame 302. For example, as leadnut 342 is retracted by leadscrew 340, gear 324 engages rack 326 and rotates counterclockwise. Additionally, gear 322 rotates counterclockwise and engages rack 314 of finger mechanism 310 causing finger mechanism 310 to move relative to gear 320 and leadnut 342. Thus, hook 312 of finger mechanism 310 has retracted or translated a greater distance than leadnut 342 has traveled. The sizing of gear 320 and length of rack 314 may be such that when leadnut 342 reaches a fully retracted position as shown in FIG. 3C, hook element 312 has traveled a desired distance to have dragged a storage device onto picker 302.

The degree to which finger mechanism 310 moves relative to leadnut 342 may be adjusted by varying the ratio of gear sizes (i.e., pitch diameter) of small gear 322 and large gear 324. Additionally, in one example, small gear 322 and large gear 324 could have equal diameters, thereby creating a 2-to-1 ratio of movement of finger mechanism 310 to leadnut 342 (ratios are described in greater detail with respect to FIG. 5). In other examples, gear combinations may be included such that the finger mechanism 310 moves a distance less than the distance of leadnut 342 during translation of leadnut 342. Such a system may be desirable for moving a finger mechanism with increased force, increased precision, or the like.

Additionally, rack 326 and 314 may be varied for different positional extremes. For example, the starting or ending positions of finger mechanism 310 relative to picker 302 may be adjusted by assembling finger rack 314 at different lateral positions with respect to leadnut 342 such that different teeth of small gear 322 engage rack 314.

Figure 5:
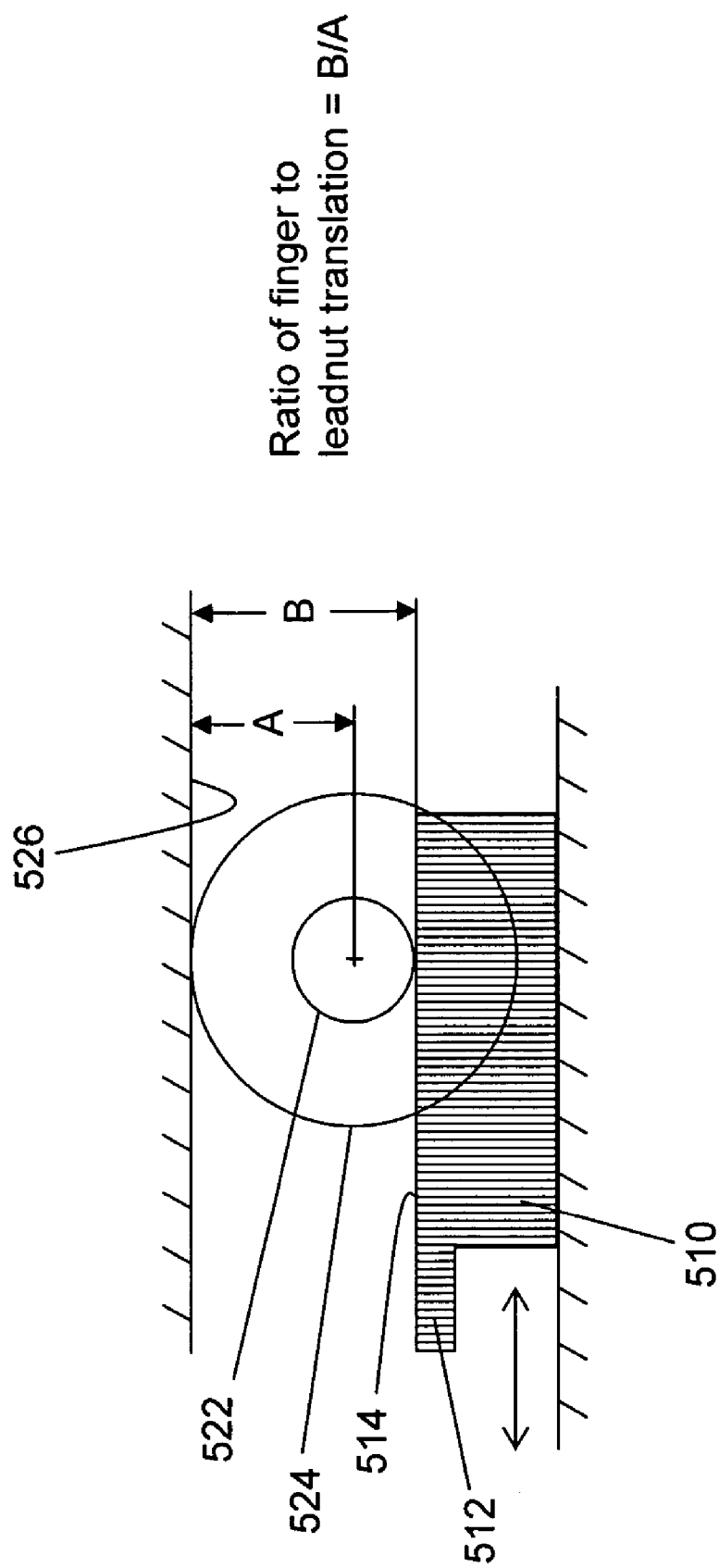
FIG. 5 illustrates a schematic view of an exemplary gear combination engaging a finger mechanism and portion of the picker frame.

FIG. 5 illustrates another exemplary gear combination including gear 524 and gear 522, which engage a portion of frame 526 and a portion 514 of finger mechanism 510 respectively. In this example, gears 522 and 524 are friction gears, i.e., they do not include teeth or castellations. Further, in this example, the ratio of translation of finger mechanism 510 to translation of the translation member (not shown) attached to gear 524 is given by the ratio of the distance "A" between the axis of rotation of gear 522 and frame 526 and the distance "B" between the portion 514 of finger mechanism 510 and frame 526 ("B"). Thus, the ratio of finger mechanism 510 translation to leadnut translation is B/A. It will be recognized that various ratios may be used depending on particular applications, design considerations, and the like. Additionally, the ratio may be less than 1 such that the finger mechanism translates a distance less than the leadnut or other translation member.

In one example, a picker mechanism substantially as illustrated herein was equipped with a leadnut/leadscrew having an available translation distance of the leadnut along the leadscrew of 88 mm. A gear assembly including two coaxially aligned gears was rotatably mounted with the leadnut and included 10 teeth on a small gear portion having a pitch diameter of 5 mm and 32 teeth on a large gear portion having a pitch diameter of 16 mm. The resulting translation distance of the finger mechanism was 115.5 mm (compared with the 88 mm distance of the leadnut). Accordingly, a translation distance of the finger mechanism exceeded the available translation distance of the leadnut along the leadscrew.

The above detailed description is provided to illustrate exemplary embodiments and is not intended to be limiting. It will be apparent to those of ordinary skill in the art that numerous modification and variations within the scope of the present invention are possible. For example, various finger members, blocks, gears, leadnut/leadscrew systems, and the like may be used in the present examples. Additionally, particular examples have been discussed and how these examples are thought to address certain disadvantages in related art. This discussion is not meant, however, to restrict the various examples to methods and/or systems that actually address or solve the disadvantages. Accordingly, the present invention is defined by the appended claims and should not be limited by the description herein.

The invention claimed is:

1. An apparatus for transferring storage devices within an automated storage library, comprising:
   a frame;
   a translation member for translating relative to the frame, wherein the translation member includes a leadnut operable to translate along a leadscrew;
   a finger mechanism slidably mounted to the frame, the finger mechanism having a finger member for engaging a storage device, wherein
      the finger mechanism is mechanically associated with the translation member, and
      movement of the translation member results in relative movement of the finger mechanism to the translation member such that the finger mechanism moves a distance different than that of the translation member; and
   a gear assembly rotatably mounted to the leadnut, wherein a first portion of the gear assembly engages a portion of the frame and a second portion of the gear assembly engages a portion of the finger mechanism such that translation of the leadnut results in relative movement of the finger mechanism to the leadnut.

2. The apparatus of claim 1, wherein the gear assembly includes two co-axially attached gears corresponding to the first portion and the second portion, wherein the two co-axially attached gears vary in pitch diameter.

3. The apparatus of claim 1, wherein the frame further includes a rack which engages the first portion of the gear assembly causing rotation of the gear assembly as the leadnut translates.

4. The apparatus of claim 1, where the finger mechanism further includes a rack that engages the second portion of the gear assembly causing relative translation of the finger mechanism to the leadnut during rotation of the gear assembly.

5. The apparatus of claim 1, wherein the finger mechanism is adapted to be extended through an opening of the frame.

6. The apparatus of claim 1, wherein the finger assembly is adapted to engage a storage device.

7. An automated storage library system, comprising the apparatus of claim 1.

8. A method for engaging a storage device with a telescoping finger mechanism, the method comprising:
   moving a translation member along a picker frame, the translation member mechanically coupled with a finger mechanism, wherein
   the translation member includes a leadnut operable to translate along a leadscrew, and
   a gear assembly is rotatably mounted to the translation member, and a first portion of the gear assembly engages a portion of the picker frame and a second portion of the gear assembly engages a portion of the finger mechanism such that translation of the translation member results in relative movement of the translation member and the finger mechanism such that the finger mechanism translates a distance different than the translation member.

9. The method of claim 8, wherein the gear assembly includes two co-axially attached gears corresponding to the first portion and the second portion, wherein the two co-axially attached gears vary in pitch diameter.

10. The method of claim 8, wherein the frame further includes a rack which engages the first portion of the gear causing rotation of the gear assembly as the leadnut is driven along the leadscrew.

11. The method of claim 8, where the finger mechanism further includes a rack that engages the second portion of the gear causing relative translation of the finger mechanism to the leadnut.

12. The method of claim 8, further including extending the finger mechanism through an opening of the frame.

13. The apparatus of claim 8, further including engaging a storage device and retracting the finger assembly with the storage device into the frame.

14. An apparatus for transferring storage devices within an automated storage library, comprising:
   a frame;
   a translation member for translating relative to the frame, wherein the translation member includes a leadnut operable to translate along a leadscrew;
   a finger mechanism slidably mounted to the frame, the finger mechanism having a finger member for engaging a storage device, wherein
      the finger mechanism is mechanically associated with the translation member, and
      movement of the translation member results in relative movement of the finger mechanism to the translation member such that the finger mechanism moves a distance different than that of the translation member, wherein the distance the finger mechanism moves is greater than the distance of the translation member.

15. The apparatus of claim 14, further comprising a gear assembly rotatably mounted to the leadnut, wherein a first portion of the gear assembly engages a portion of the frame and a second portion of the gear assembly engages a portion of the finger mechanism such that translation of the leadnut results in relative movement of the finger mechanism to the leadnut.

* * * * *